(No Model.)
M. OBER & P. SCHOTTMÜLLER.
BICYCLE SUPPORT.
No. 576,883. Patented Feb. 9, 1897.
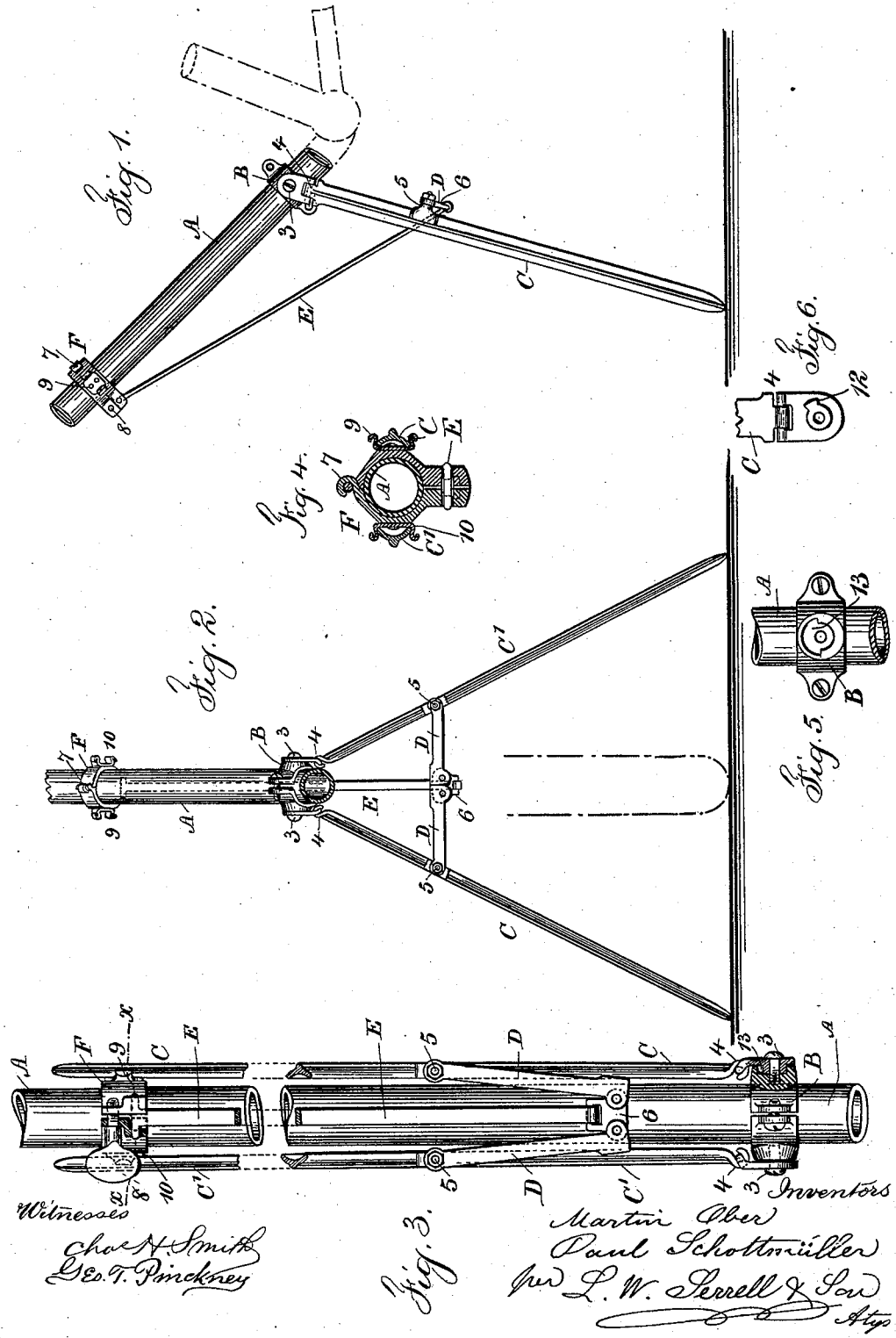

UNITED STATES PATENT OFFICE.

MARTIN OBER AND PAUL SCHOTTMÜLLER, OF NEW YORK, N. Y.

BICYCLE-SUPPORT.

SPECIFICATION forming part of Letters Patent No. 576,883, dated February 9, 1897.

Application filed May 19, 1896. Serial No. 592,230. (No model.)

*To all whom it may concern:*

Be it known that we, MARTIN OBER and PAUL SCHOTTMÜLLER, citizens of the United States, residing at New York, in the county and State of New York, have invented an Improvement in Bicycle-Supports, of which the following is a specification.

Supports of various kinds have been provided for bicycles to hold them up vertically when not in use, and in some instances legs connected together by toggle-bars or rule-joints have been employed at one side of the cycle.

In the present invention two legs are connected together by a toggle-brace or rule-joint, and the upper ends of the legs are pivoted upon a ring surrounding one of the frame-tubes, preferably the diagonal tube between the saddle-post and the front fork, and a sliding clip is provided on the same tube, having a diagonal brace that is jointed at the other end to the toggle-bars, and upon the same sliding clip are spring-catches for holding the legs when turned out of use, the parts being constructed and proportioned in such a manner that when the bicycle is to be supported the legs are disconnected from the spring-catches, the sliding clip is loosened, and the legs are swung down into position and spread by the toggle-links, and the sliding clip is simply tightened in its proper position, so as to hold the toggle-links in their proper position while supporting the cycle.

In the drawings, Figure 1 is a side view illustrating the present improvement as spread for use. Fig. 2 is a diagrammatic elevation of the parts with the frame-tube in section, and Fig. 3 is an enlarged and inverted plan view illustrating the parts with the legs closed up against the sides of the tube and out of use. Fig. 4 is a cross-section at the line *x x*, Fig. 3. Fig. 5 is a side view of the clip with the leg removed, and Fig. 6 shows the joint on the leg.

The tube A is advantageously the diagonal tube in a bicycle-frame between the front and back wheels, and upon this tube A is a joint-block B, which is advantageously clamped in position for use. This joint-block can be made in two parts with projecting ears, through which screws pass to clamp the half-circle segments upon the tube. At opposite sides of the joint-block are pivot-screws 3, connecting to the joint-block the legs C C', and each leg is preferably formed with hinges at 4, connecting the main portion of the leg with the short segment through which the pivot-screw 3 passes, and these legs C C' are advantageously ribbed on their exterior surfaces and concave on their interior surfaces, so as to be stiff and light, and upon each leg there is a projecting stud 5, forming a pivotal connection for the toggle-bars D, which are advantageously made with double rule-joints, as shown, and the central piece 6 of the joint has connected with it a brace E, and the other end of the brace E is connected with the sliding clip F, there being hinges or pivots at the respective ends of the braces, and the sliding clip F is advantageously made of two semicircular parts hinged together at 7 and having a clamping-screw 8, by which the sliding clip can be held at any desired place to which it may be moved, and there are upon the opposite sides of the sliding clip the spring-catches 9 and 10, which spring-catches are adapted to receive the legs C C' when turned up into line with the tube A.

It will now be understood that the toggle-bars D lie closely adjacent to each other when the legs C C' are folded up parallel with the tube A and the brace F lies parallel or nearly so with the tube A, and when the legs have been sprung out from the catches 9 and 10 they can be swung down to the desired position, the clip F sliding upon the tube A, and then the legs C and C' can be spread apart and the toggle-bars D swung down into line with each other and the screw 8 tightened, thereby holding the legs in their proper position and supporting the cycle, so that it will not fall over at either side, and by simply loosening the screw 8 and sliding the clip F along upon the tube A the parts can be folded up and held in position ready for use whenever required.

It is advantageous to make the brace E with a T-shaped end to pass into holes in the clip F, as seen in Figs. 3 and 4, to form the pivot, and there may be upon the upper ends of the legs C C' stops 12, (see Figs. 3 and 6,) entering recesses 13 in the clip B, adjacent to the attaching-screws 3, so as to limit the swing of the legs as they are turned down into position for use.

We claim as our invention—

1. The combination with the tubular cycle-frame, of a joint-block, two legs pivoted to the joint-block, toggle-bars between the legs, a brace connected with the toggle-bars at the middle joint, a sliding clip upon the cycle-frame, and a pivotal connection between the clip and brace, substantially as set forth.

2. The joint-block made of two parts screwed together, in combination with the legs pivoted upon the joint-block and each leg made with a short section hinged to the longer section and through which short section the pivot-screws pass, toggle-levers connected by a central joint and pivoted upon the legs, a sliding clip upon the cycle-frame and a brace pivoted at its ends and extending from the sliding clip to the toggle-bars, substantially as set forth.

3. The combination with the cycle-frame, of a joint-block made in two parts and clamped to the frame, supporting-legs pivoted at their upper ends to the joint-block and made with a projecting rib at one side and a concave surface at the other side, toggle-bars pivoted at their ends to the legs, and a brace connected with the toggle-bars and a sliding clip upon the cycle-frame to which the end of the brace is pivoted, substantially as set forth.

4. The combination with the cycle-frame, of a joint-block, legs pivoted to the joint-block and toggle-bars between the legs, a sliding clip and a brace pivoted at one end to the sliding clip and at the other end to the toggle-bars and spring-catches upon the sliding clip for holding the legs when out of use, substantially as set forth.

5. The combination with the clip B recessed at 13, of the legs having stops 12 entering such recesses and pivotal connections for the legs, substantially as specified.

Signed by us this 15th day of May, 1896.

MARTIN OBER.
PAUL SCHOTTMÜLLER.

Witnesses:
GEO. T. PINCKNEY,
S. T. HAVILAND.